US012754333B2

(12) United States Patent
Crook et al.

(10) Patent No.: US 12,754,333 B2
(45) Date of Patent: Oct. 6, 2026

(54) LAND SEISMIC DATA ACQUISITION WITH CONTROLLED RANDOMIZATION

(71) Applicant: OptiSeis Solutions Ltd., Calgary (CA)

(72) Inventors: Andrea Crook, Calgary (CA); Mostafa Naghizadeh, Calgary (CA)

(73) Assignee: OptiSeis Solutions Ltd., Calgary (CA)

( * ) Notice: Subject to any disclaimer, the term of this patent is extended or adjusted under 35 U.S.C. 154(b) by 613 days.

(21) Appl. No.: 18/211,501

(22) Filed: Jun. 19, 2023

(65) Prior Publication Data

US 2024/0418882 A1 Dec. 19, 2024

(51) Int. Cl.
*G01V 1/00* (2006.01)

(52) U.S. Cl.
CPC .......... *G01V 1/003* (2013.01); *G01V 2210/16* (2013.01)

(58) Field of Classification Search
CPC ........................... G01V 1/003; G01V 2210/16
See application file for complete search history.

(56) References Cited

U.S. PATENT DOCUMENTS

| | | | |
|---|---|---|---|
| 4,481,001 A | 11/1984 | Graham et al. | |
| 6,691,075 B1 | 2/2004 | Winbow et al. | |
| 9,081,107 B2 | 7/2015 | Abma et al. | |
| 9,354,337 B2 | 5/2016 | Ikelle et al. | |
| 9,753,165 B2 | 9/2017 | Alhukail et al. | |
| 10,156,648 B1 | 12/2018 | Jiang | |
| 10,317,542 B1 | 6/2019 | Jiang | |
| 10,809,402 B2 | 10/2020 | Li et al. | |
| 10,823,867 B2 | 11/2020 | Eick et al. | |
| 11,269,092 B2 | 3/2022 | Hardouin et al. | |
| 11,543,550 B2 | 1/2023 | Strand et al. | |
| 2004/0215396 A1* | 10/2004 | Christie | G01V 1/28 702/14 |
| 2012/0065891 A1 | 3/2012 | Ikelle et al. | |
| 2012/0176861 A1 | 7/2012 | Abma et al. | |
| 2015/0031008 A1 | 1/2015 | Black et al. | |
| 2015/0124560 A1 | 5/2015 | Chengbo et al. | |
| 2016/0131779 A1 | 5/2016 | Alhukail et al. | |
| 2017/0176614 A1 | 6/2017 | Alhukail et al. | |
| 2018/0061279 A1 | 3/2018 | Niimi et al. | |

(Continued)

FOREIGN PATENT DOCUMENTS

| | | |
|---|---|---|
| WO | WO 2017/155941 | 9/2017 |
| WO | WO PCT/CA2024/050816 | 8/2024 |

OTHER PUBLICATIONS

Candes et al., "An Introduction to Compressive Sampling", IEEE Signal Processing Magazine, Mar. 2008, United States, 10 pages.

(Continued)

*Primary Examiner* — Abdallah Abulaban
(74) *Attorney, Agent, or Firm* — Wells St. John P.S.

(57) ABSTRACT

A method is provided of designing seismic surveys for a geographical area using controlled randomization. The method comprises the steps of selecting the geographical area to be surveyed; determining placement for one or more control areas, wherein each control area comprises a plurality of stations, within the geographical area; applying a randomization algorithm to each of the one or more control areas; creating a Fresnel fold map of the geographical area; and applying a relative standard deviation algorithm to the Fresnel fold map to confirm if the randomization algorithm has created an even distribution of data.

17 Claims, 7 Drawing Sheets

(56) References Cited

U.S. PATENT DOCUMENTS

| | | | |
|---|---|---|---|
| 2018/0147776 | A1 | 5/2018 | Kotani |
| 2019/0283316 | A1 | 9/2019 | Rolland et al. |
| 2020/0072998 | A1* | 3/2020 | Mensch ............... G01V 1/3861 |
| 2021/0055437 | A1* | 2/2021 | Strand ...................... G01V 1/38 |
| 2024/0393486 | A1 | 11/2024 | Crook et al. |

OTHER PUBLICATIONS

Gibson et al., "Promoting Environmental Responsibility in Seismic Operations", Oilfield Review, Summer 2003, United States, pp. 10-21.

Hennenfent et al., "Simply Denoise: Wavefield Reconstruction Via Jittered Undersampling", Geophysics vol. 73, No. 3, May-Jun. 2008, United States, pp. V19-V28.

Naghizadeh et al., "On Sampling Functions and Fourier Reconstruction Methods", Geophysics vol. 75, No. 6, Nov.-Dec. 2010, United States, pp. WB137-WB151.

Naghizadeh, "Double-Weave 3D Seismic Acquisition—Part 1: Sampling and Sparse Fourier Reconstruction", Geophysics vol. 80, No. 6, Nov.-Dec. 2015, United States, pp. WD143-WD162.

Naghizadeh, "Double-Weave 3D Seismic Acquisition—Part 2: Seismic Modeling and Subsurface Fold Analyses", Geophysics vol. 80, No. 6, Nov.-Dec. 2015, United States, pp. WD163-WD173.

Sweeney et al., "Integrating Environmental Impact Evaluation into a Quality, Health, Safety, and Environmental Management System,", SPE International, 74009, 2002, United States, 8 pages.

* cited by examiner

LAND SEISMIC DATA ACQUISITION WITH CONTROLLED RANDOMIZATION

FIELD

The invention relates to systems and methods for designing seismic surveys to enable seismic data acquisition with a reduced environmental impact and lower survey costs. The methods include incorporating a controlled random decimation of seismic receivers or sources along a fixed or varying distance on seismic lines, or over a specified area.

BACKGROUND

Seismic surveys are a method of exploration geophysics used to estimate the properties of the Earth's subsurface from reflected seismic waves. Generally, seismic surveys are conducted across survey areas wherein seismic data is acquired by imparting a seismic source of energy into the ground and then listening for reflected energy at a number of nearby receivers.

Seismic waves are mechanical perturbations that travel in the Earth at a speed governed by the acoustic properties of the medium in which they are travelling. The acoustic (or seismic) impedance of a medium, Z, is defined by the equation:

$$Z = v\rho$$

where v is the seismic wave velocity and ρ (rho) is the density of the rock.

When a seismic wave travelling through the Earth encounters an interface between two materials with different acoustic impedances, some of the wave energy will reflect off the interface and some will refract through the interface. Thus, and fundamentally, the seismic reflection technique consists of generating seismic waves and measuring the time taken for the waves to travel from the source, reflect off an interface and be detected by the array of receivers at the surface.

Knowing travel times from the source to various receivers, and the velocity of the seismic waves, software is used to reconstruct the pathways of the waves to build up an image of the subsurface.

Seismic surveys are conducted over wide areas of land and water as a means of understanding underlying geological formations.

Currently, almost all oil and gas exploratory wells are preceded by 3D seismic surveys. The basic method of a 3D survey is the same as for a 2D survey; however, in a 3D survey, instead of a single line of energy source stations and receiver stations, the source stations and receiver stations are laid out in a grid across the ground surface. As a result, recorded reflections that are received at each receiver point come from all directions, requiring sophisticated computer programs to analyze this data to create a three-dimensional image of the subsurface.

As noted, 3D surveys are acquired by laying out energy source stations and receiver stations in a grid over the land area to be surveyed. The receiver stations are set to record the reflected vibrations from the source stations and are typically laid out in parallel lines (receiver lines). The source stations are also laid out in parallel lines that are generally perpendicular to the receiver lines, but may be in other orientations, with regular or irregular spacing. The spacing of the source and receiver stations and lines is determined by the design and objectives of the survey.

Energy sources for a seismic survey are most commonly either subsurface explosive charges or surface vibroseis, although a seismic survey is not limited to using these specific energy sources, only that the seismic energy input into the subsurface needs to be sufficient to travel downwards and reflect off the target of interest and return to surface with sufficient energy to be distinguished from background noise.

3D surveys are conducted over a large area in order to provide sufficient data for accurate interpretation of the subsurface geology. Surveys are conducted over all types of land including rural land and remote land. Depending on the location, any type of surface feature may be present on the surface including any type of forest, vegetation and/or man-made features. Conducting a survey requires the physical placement of sources and receivers at known locations. Given the need to prepare ground to ensure safe placement of sources and proper placement of receivers, each source and receiver requires access to specific ground locations by both personnel and heavy equipment. Moving teams of personnel and equipment deep into remote areas is challenging, requiring cutlines to be cut through forest to enable this access.

3D surveys conducted at different times and covering different but adjacent areas can later be combined into a single data set for processing and analysis, provided there is sufficient overlap of the areas covered by the two surveys.

In the past, when a survey was being planned, for simplicity, source and receiver lines were simply designed as cut lines orthogonal to one another, which has an impact on the environment. That is, machinery would be deployed to the field and would cut broad and uniform lines through forest/vegetation and/or plow/push lines through various habitats to enable the source and receiver lines to be set up.

A full seismic survey representation is conducted with regular sampling of the source and receiver stations and lines. Randomization enables the quantity of source stations and receiver stations used to be reduced but can result in an irregular distribution of source and receiver stations and/or lines throughout the survey area. By randomizing the receiver stations and source stations used in a controlled setting, a similar set of data can be produced when compared to a full representation with fewer sources and explosive devices required, allowing for lowered costs. Randomization has favorable properties for seismic data reconstruction algorithms which leads for better imaging of subsurface targets. Current technology conducts randomization of an entire geographical area, resulting in potential areas being overrepresented or underrepresented in the data, instead of randomizing groups of sources and receivers to equalize the spread throughout the geographical area being tested.

SUMMARY

A method is provided of designing seismic surveys for a geographical area using controlled randomization. The method comprises the steps of selecting the geographical area to be surveyed; determining placement for one or more control areas, wherein each control area comprises a plurality of stations, within the geographical area; applying a randomization algorithm to each of the one or more control areas; creating a Fresnel fold map of the geographical area; and applying a relative standard deviation algorithm to the Fresnel fold map to confirm if the randomization algorithm has created an even distribution of data.

A method of designing seismic surveys for a geographical area using controlled randomization. The method comprises the steps of selecting the geographical area to be surveyed; determining placement for one or more control areas, wherein each control area comprises a plurality of stations, within the geographical area; and applying a randomization algorithm to each of the one or more control areas.

BRIEF DESCRIPTION OF THE DRAWINGS

Various objects, features and advantages of the disclosure will be apparent from the following description of particular embodiments of the disclosure, as illustrated in the accompanying drawings. The drawings are not necessarily to scale, emphasis instead being placed upon illustrating the principles of various embodiments of the disclosure. Similar reference numerals indicate similar components.

DETAILED DESCRIPTION

Figure 1:
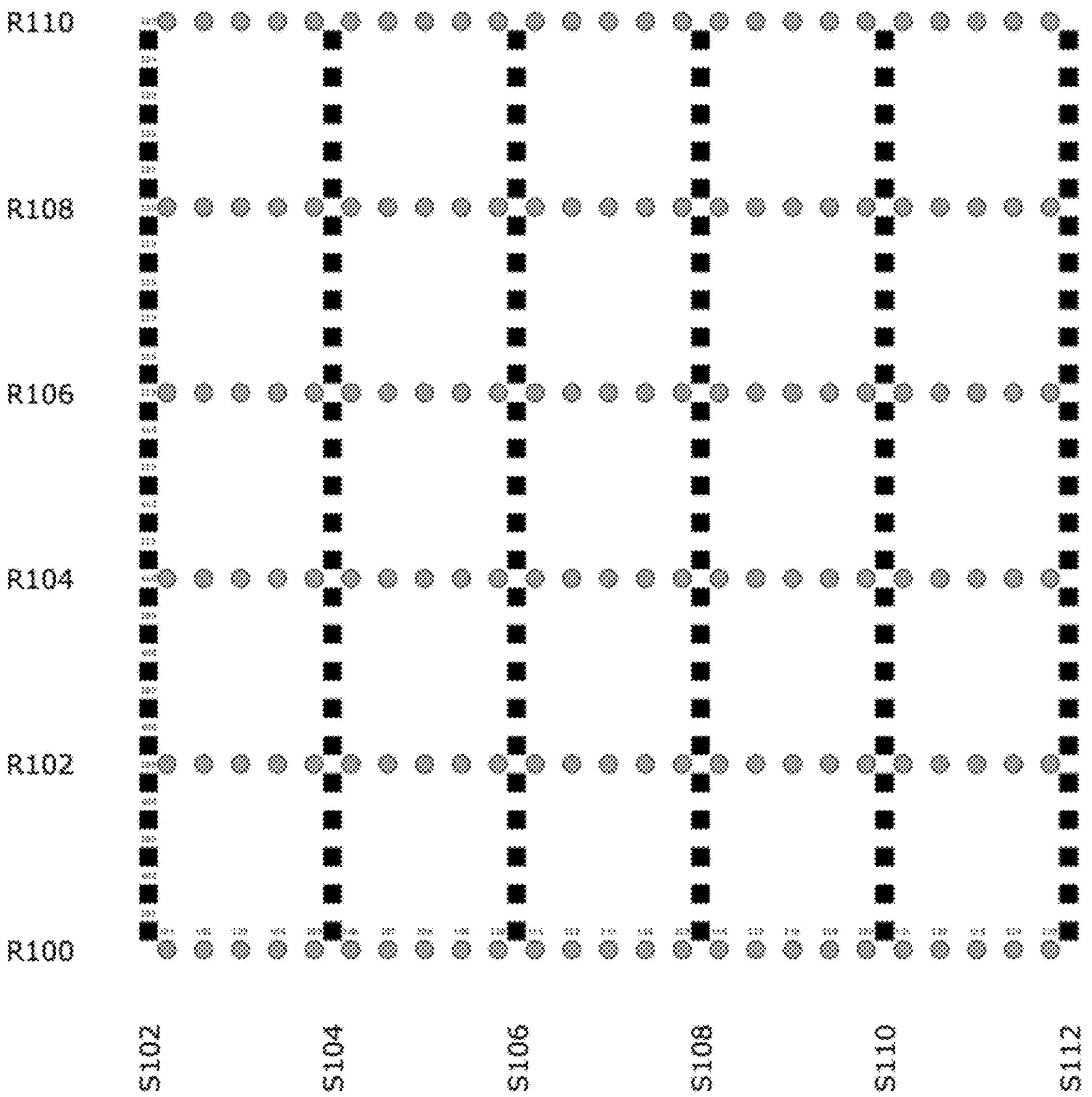
FIG. 1 depicts a regularly sampled conventional orthogonal survey.
Figure 2:
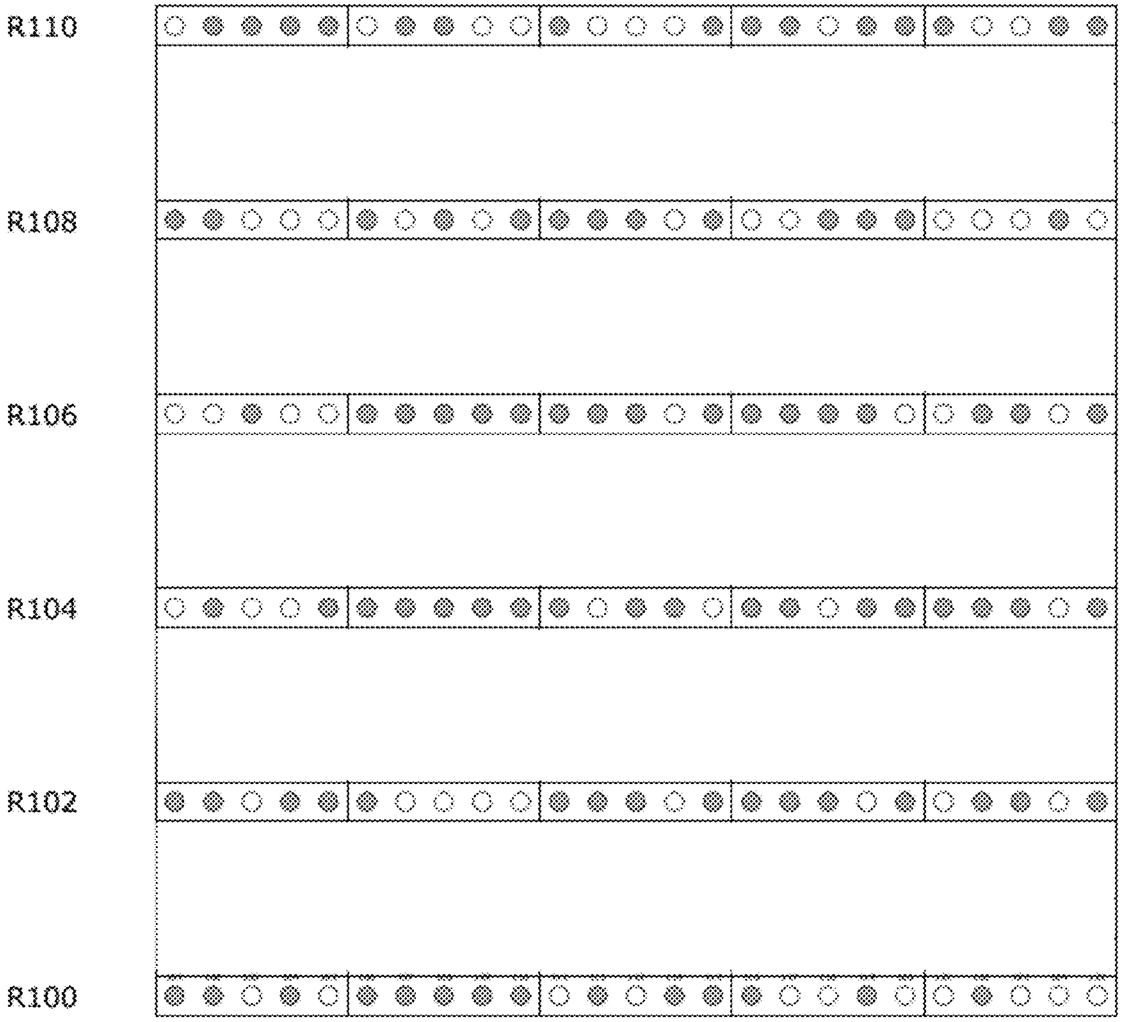
FIG. 2 depicts a pure random 40% decimation of the receivers from orthogonal survey shown in FIG. 1.

Various aspects of the disclosure will now be described with reference to the figures. For the purposes of illustration, components depicted in the figures are not necessarily drawn to scale. Instead, emphasis is placed on highlighting the various contributions of the components to the functionality of various aspects of the disclosure. A number of possible alternative features are introduced during the course of this description. It is to be understood that, according to the knowledge and judgment of persons skilled in the art, such alternative features may be substituted in various combinations to arrive at different embodiments of the present disclosure.

With reference to the figures, a method for seismic survey planning and implementation is described. The method described enables improved survey planning and design of seismic surveys to reduce the number of seismic receiver stations (sensors) and/or source stations, while maintaining a uniform coverage of study area without big gaps.

The control aspect involves applying the randomization over a control area, rather than applying randomization over the entire geographical area. There can be multiple control areas within the overall geographical area to be surveyed, and the control area or areas can take up all or some of the entire geographical area to be surveyed. This control area can be defined by any one of the following:

i) Distance along a source line between two/receiver lines or the distance along a receiver line between two source lines (a salvo)

ii) Multiple salvos iii) Maximum permitted gap (example—one, two, three, etc. source or receivers station interval(s))

iv) Fresnel Zone distance (frequency and subsurface target dependent)

v) Fixed and varying areal extents bounded by one or more source or receiver lines, or a fixed number of source or receiver stations.

It is possible to have any combination of the above control area types within a single overall geographical area to be surveyed. The randomization is repeated across a part or all of the geographical area to be surveyed (in-line, crossline, areal, or a combination). A station interval is the interval between consecutive source and receiver stations. A Fresnel Zone determines the horizontal resolution of seismic surveys at a specific depth. Areal geometry comprises a control area of a smaller area of the geographical area but is larger than one salvo.

The result is a geographic area with a similar footprint to the geographic area to be surveyed, but with fewer sources and receivers used. The reduction in sources and receivers can be defined by a number of sources and receivers to remove per control area or by the percentage of sources and receivers to be removed per control area. The percentage of sources and receivers to remove may be rounded up or down to a whole number. Also, the controlled randomization may be applied over a limited region of the survey area instead of the entire survey area.

The method described by the disclosure designs a seismic survey for a selected geographical area with a controlled randomized distribution of sources and receivers. This method may be applied to a geographical area to determine the installation location of sources and receivers and to determine the distribution of data collection points from the receivers and sources. The method may also be applied to a geographical area where sources and receivers have already been installed to determine which receivers and sources will be used for data collection. Furthermore, this method can be applied in overlapping and/or adjacent geographical areas across the entire survey or limited to specific geographical areas. The controlled randomization allows for decimation of data by reducing the number of data collection points on the receiver lines and source lines, respectively. The decimation of the data and distribution of sources and receivers may be variable over the geographical area.

Sources generate seismic waves after an event occurs, such as setting off controlled explosives. The seismic waves emitted from the source are recorded by nearby receivers. The sources and receivers are typically set up into source lines and receiver lines to create an orthogonal grid. Referring to FIG. 1, a conventional orthogonal seismic survey comprises source lines and receiver lines deployed in an orthogonal grid is shown, with the source lines acting as the vertical lines on the grid and the receiver lines acting as the horizontal lines on the grid. Referring to FIGS. 1 to 5, receiver lines are numbered from R100 to R110, and source lines are numbered from S102 to S112. The grid as shown in FIG. 1 allows the use of salvos, where a salvo is the distance between two source or receiver lines.

Figure 3:
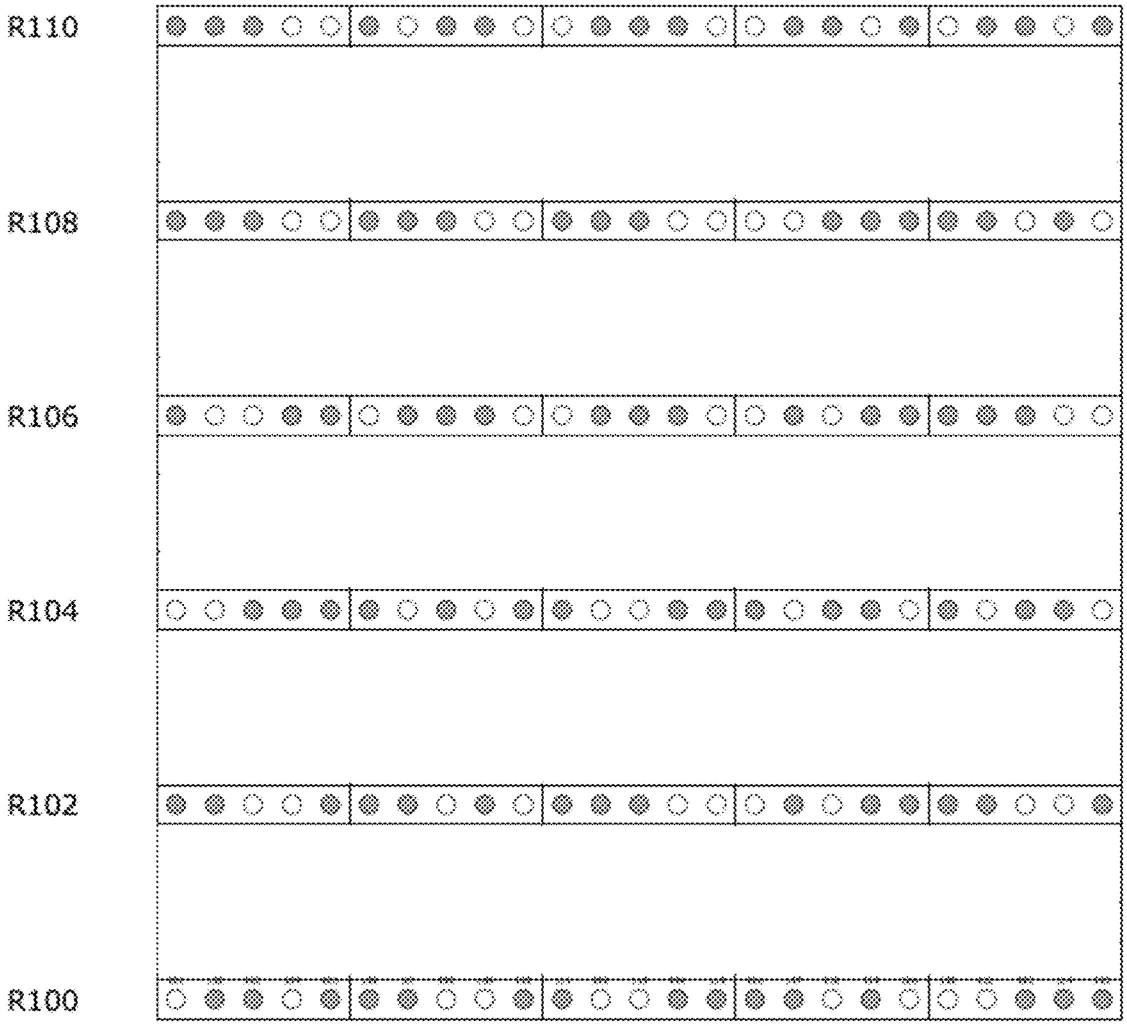
FIG. 3 depicts a controlled random 40% decimation of the receivers from orthogonal survey shown in FIG. 1.

According to an embodiment of the disclosure, applying a controlled randomization algorithm to distribute data for each receiver line by decimating the data between salvos, ensures local regions of the geographical area retain a consistent minimum distribution of data collection and avoids creating local regions of heavy data collection, which would lead to a misrepresentation of the data collected. In the present method, the source or receiver stations are decimated along each source or receiver line (or within a specified area) using a controlled randomization algorithm which decimates the data between each salvo, or using Fresnel zone size (or another distance or area metric), making sure that the decimation does not lead to big gaps in the survey coverage. The resulting survey using the salvo-controlled randomization on receivers is shown in FIG. 3.

It is possible to apply the randomization algorithm to a control area only once, or singly, to determine a decimation of source or receiver stations. It is also possible apply the randomization algorithm to a control area multiple times, or in sequence, before selecting a most suitable and satisfactory decimation and distribution of stations.

Applying a randomization algorithm to the receivers without any control creates areas that are overrepresented, with some areas between salvos being fully represented and other areas having only one, or even no, receiver installed. The use of a pure random decimation strategy is referred to in FIG. 2 and creates the potential for large gaps in the survey coverage which is not suitable for data reconstruction algorithms.

Figure 4:
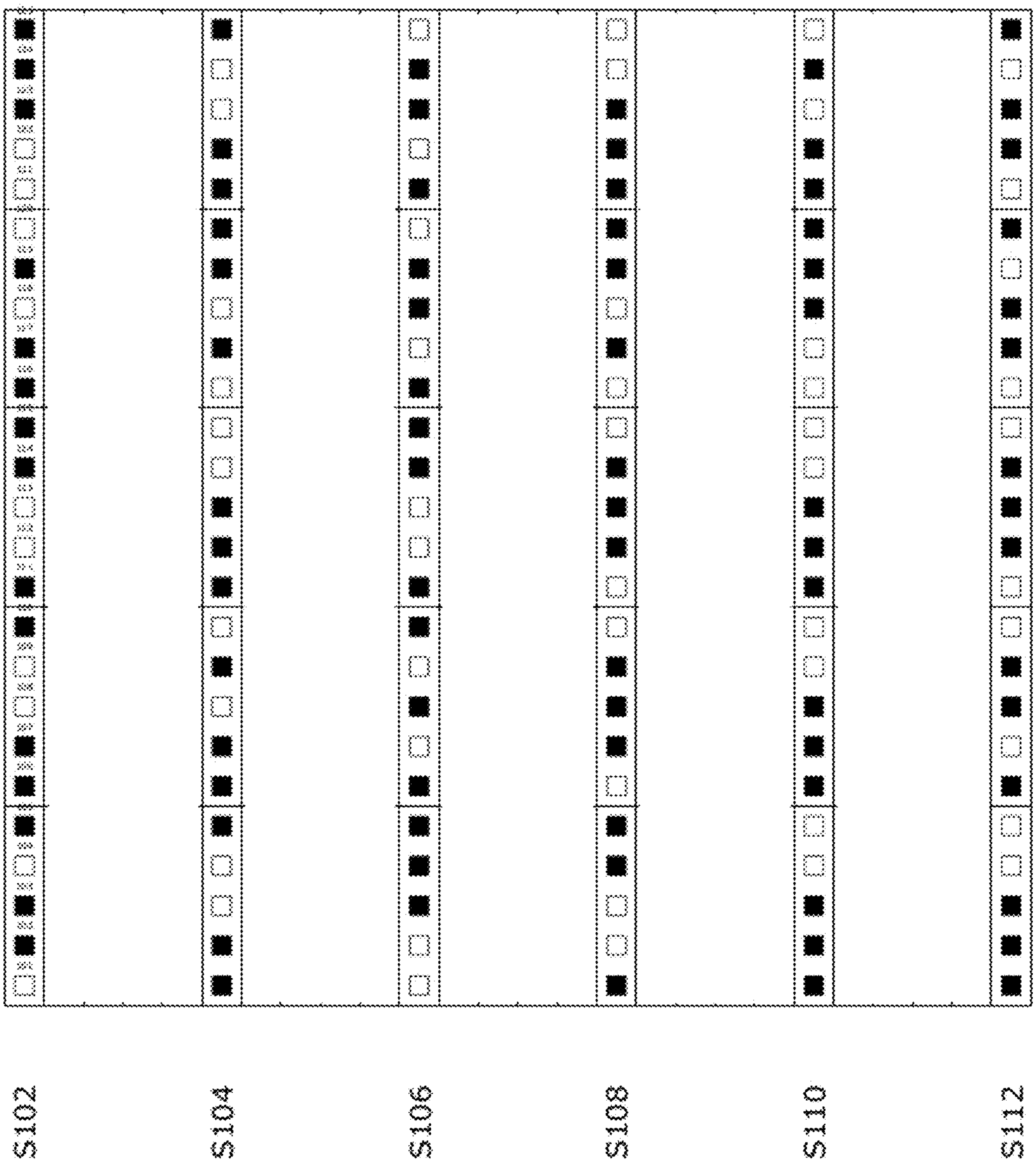
FIG. 4 depicts a controlled random 40% decimation of the sources from orthogonal survey shown in FIG. 1.
Figure 5:
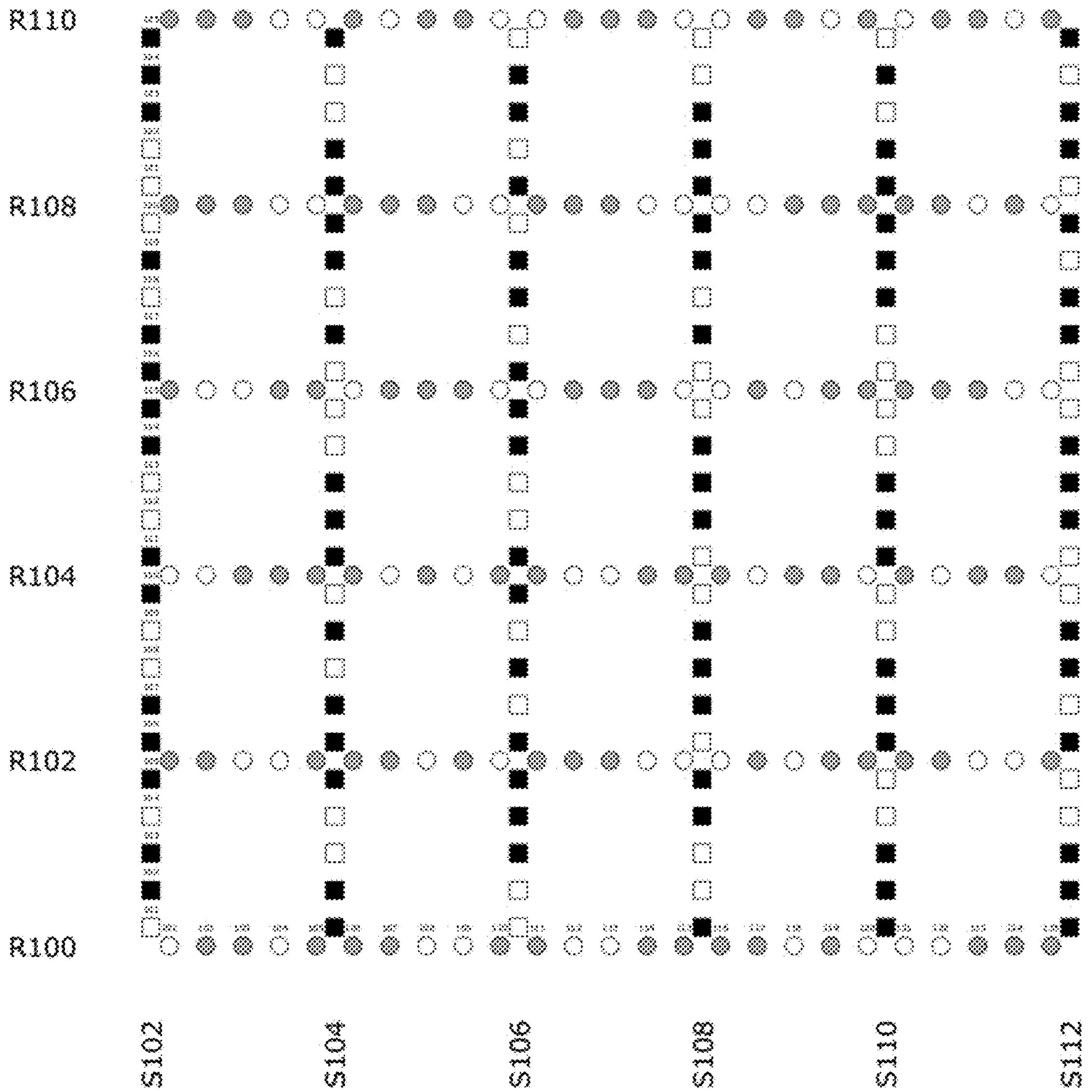
FIG. 5 depicts a controlled random 40% decimation of both receivers and sources from orthogonal survey shown in FIG. 1.

Referring to FIG. 4, seismic sources can be decimated with the same salvo-controlled randomization algorithm used on the receivers. The controlled randomized decimation of receivers and sources can be implemented simultaneously to attain an optimal seismic survey quality for compressive sensing applications as shown in FIG. 5. In FIG. 5, the salvo-controlled randomization of receivers and sources guarantees an equal number of available receivers and sources, using an example of 3 out of 5 or 60%, in each salvo between the source lines and receiver lines. FIG. 5 depicts a survey that will allow for seismic data acquisition at lower survey costs with homogeneous subsurface coverage.

Figure 6:
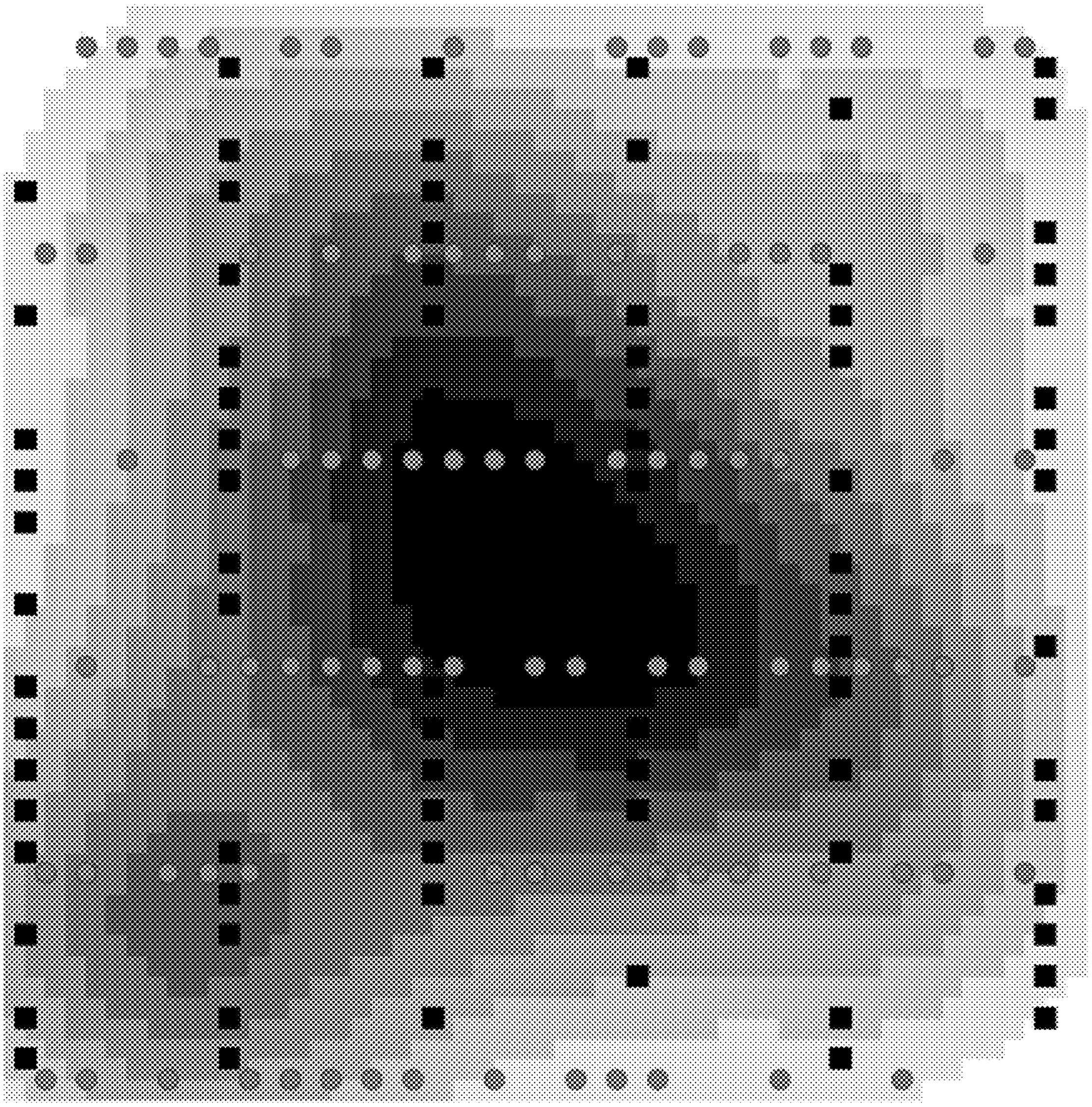
FIG. 6 depicts a Fresnel fold map for pure 40% randomization of sources and receivers.
Figure 7:
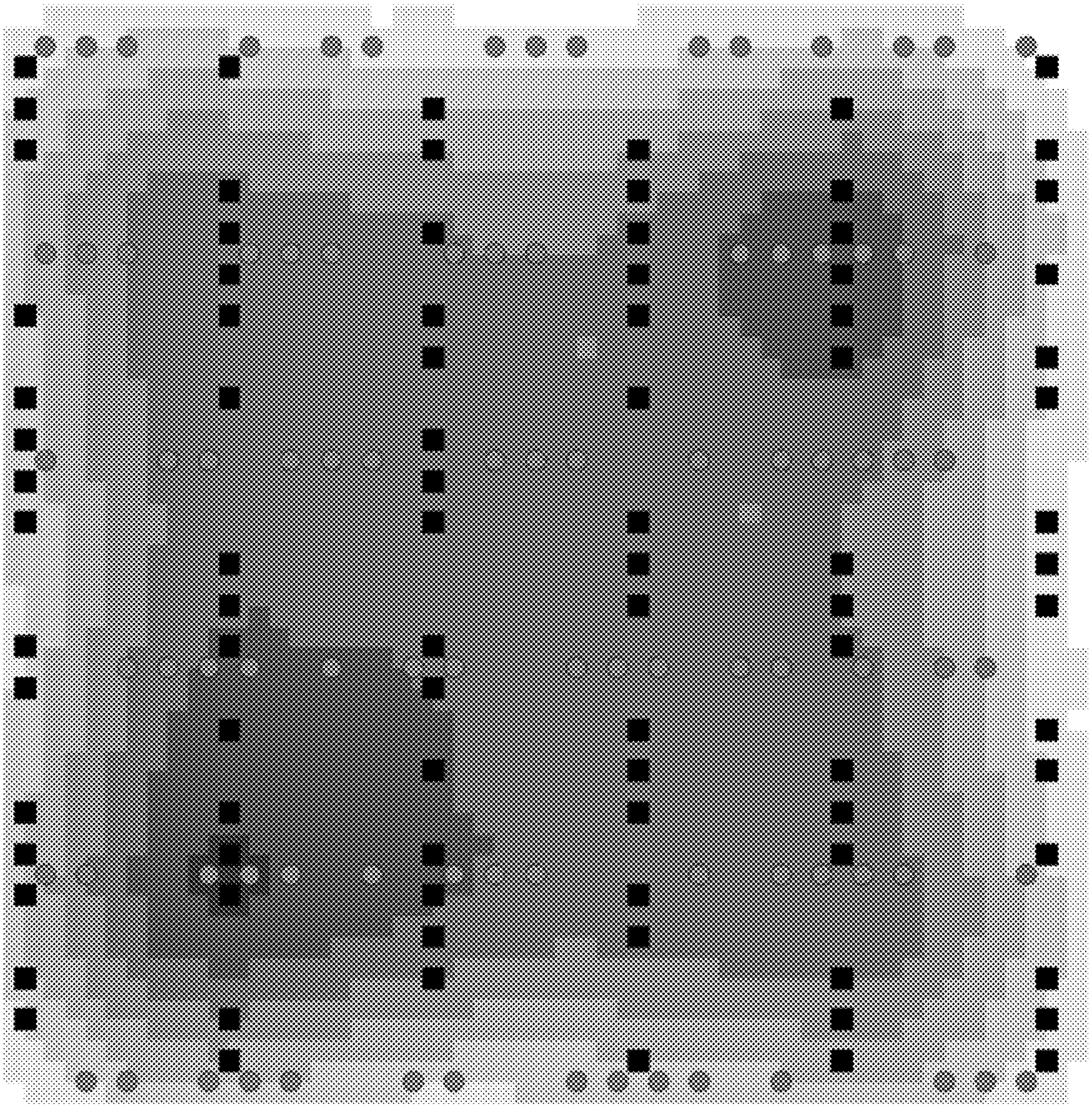
FIG. 7 depicts a Fresnel fold map for controlled 40% randomization of sources and receivers.

To analyze the suitability of randomized seismic surveys for seismic data reconstruction algorithms, offset-limited Fresnel fold maps of the surveys are generated. FIG. 6 shows the Fresnel fold map for pure randomization at 40% decimation of sources and receivers. FIG. 7 shows the Fresnel fold map for salvo-controlled randomization of sources and receivers at 40% decimation. The Fresnel fold map of salvo-controlled randomization shows a more uniform distribution than the pure randomization scenario, as depicted by the lighter and even colouring throughout the map in FIG. 7 as compared to the dark area in the center of FIG. 6. The darker colour of an area on the Fresnel fold map depicts a denser concentration of data being collected from the area. It is preferred to have an even distribution throughout the survey area without areas of overly dark or overly light areas, as those areas will provide overrepresented and underrepresented data, respectively.

A relative standard deviation ($RSD_F$) parameter is introduced after the randomization algorithm has been applied to the sources and receivers to quantitatively measure the differences between the Fresnel fold maps, which is calculated by $$RSD_F = 100 \times \left(\frac{\sigma_F}{\mu_F}\right).$$

Where $\mu_F$ is the mean of all data within a survey area and $\sigma_F$ is the standard deviation of the data from the Fresnel fold map. A smaller $RSD_F$ value indicates a more uniform distribution of the Fresnel zone coverage. In the case of applying the randomization algorithm to the control area in sequence, it is also possible to create a Fresnel fold map and to determine $RSD_F$ value for each time the randomization algorithm is applied, to determine a most suitable and satisfactory distribution of stations. In this way the method is repeated as needed until an acceptable relative $RSD_F$ value is achieved.

The method can be applied to any type of seismic geometry including, but not limited to: 2D, 3D, 4D, orthogonal, slant, megabin, linear, sinusoidal, zig-zag, areal, swath. As well, the method can be performed with any type of randomization algorithm as it is not dependent on the type of randomization, but rather the distribution of the randomization.

When designing a survey, it is important that the source and receiver density is adequate to image the subsurface target of interest. The base survey provides a base starting point to selectively move or delete sources and receivers having consideration to the environmental and other surface or subsurface data.

Although the present disclosure has been described and illustrated with respect to preferred embodiments and preferred uses thereof, it is not to be so limited since modifications and changes can be made therein which are within the full, intended scope of the disclosure as understood by those skilled in the art.

The invention claimed is:

1. A method of designing seismic surveys for a geographical area using controlled randomization, said method comprising the steps of:

a) selecting the geographical area to be surveyed;

b) determining placement for one or more control areas, wherein each control area comprises a plurality of stations, within the geographical area;

c) applying a randomization algorithm to each of the one or more control areas to decimate one or more stations of the plurality of stations in each control area;

d) creating a Fresnel fold map of the geographical area;

e) applying a relative standard deviation algorithm to the Fresnel fold map to confirm if the randomization algorithm has created an even distribution of data; and f) generating a seismic survey design having an arrangement of the plurality of stations within the one or more control areas determined by the said application of the randomization algorithm to each of the one or more control areas.

2. The method of claim 1, wherein the plurality of stations comprises one or more source stations.

3. The method of claim 1, wherein the plurality of stations comprises one or more receiver stations.

4. The method of claim 1, wherein each control area comprises a control area type selected from the group consisting of: a salvo comprising a line of receiver stations between two source lines or a line of source stations between two receiver lines; a maximum permitted gap between source stations or receiver stations; a Fresnel Zone distance comprising a horizontal resolution of seismic surveys at a specific depth; a station interval comprising an interval between consecutive source stations and receiver stations.

5. The method of claim 4, wherein the control area type comprises a plurality of salvos.

6. The method of claim 1, wherein the geographical area comprises one control area type.

7. The method of claim 1, wherein the geographical area comprises a plurality of control area types.

8. The method of claim 1, wherein the randomization algorithm is a random number generator function.

9. The method of claim 1, wherein the randomization algorithm is applied a single time to the control area.

10. The method of claim 1, wherein the randomization algorithm is applied multiple times in sequence to the one or more control areas to determine a satisfactory distribution of stations.

11. The method of claim 10, further comprising creating a Fresnel fold map and applying the relative standard deviation algorithm for each time the randomization algorithm is applied to the one or more control areas, to determine the satisfactory distribution of stations by identifying the Fresnel fold map with a lowest relative standard deviation.

12. The method of claim 1, wherein the randomization algorithm is repeated to reach a percentage value of decimated stations of the plurality of stations.

13. The method of claim 1, wherein the relative standard deviation algorithm indicates whether an even distribution of data will be obtained from a plurality of areas on the Fresnel fold map.

14. The method of claim 1, wherein the seismic survey design is generated for the geographical area before installing the plurality of stations.

15. The method of claim 1, wherein the seismic survey design is applied to the geographical area where stations have been installed previously to determine which stations will be used for data collection.

16. The method of claim 1, wherein the method is applied to any type of seismic geometry including 2D, 3D, 4D, orthogonal, slant, megabin, linear, sinusoidal, zig-zag, areal, swath.

17. A method of designing seismic surveys for a geographical area using controlled randomization, said method comprising the steps of:

a) selecting the geographical area to be surveyed;

b) determining placement for one or more control areas, wherein each control area comprises a plurality of stations, within the geographical area;

c) applying a randomization algorithm to each of the one or more control areas to decimate one or more stations of the plurality of stations in each control area; and d) generating a seismic survey design having an arrangement of the plurality of stations within the one or more control areas determined by the said application of the randomization algorithm to each of the one or more control areas.

* * * * *